US011995090B2

(12) United States Patent
Reuther et al.

(10) Patent No.: US 11,995,090 B2
(45) Date of Patent: *May 28, 2024

(54) TECHNIQUES FOR DETERMINING RELEVANT ELECTRONIC CONTENT IN RESPONSE TO QUERIES

(71) Applicant: EMB Partners, LLC, Palo Alto, CA (US)

(72) Inventors: Phyllis Reuther, Woodside, CA (US); David Kurtz, Redwood City, CA (US); Michael Connor, Oakland, CA (US)

(73) Assignee: EMB Partners, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,264

(22) Filed: Jul. 15, 2022

(65) Prior Publication Data
US 2022/0350811 A1    Nov. 3, 2022

Related U.S. Application Data

(63) Continuation of application No. 16/882,237, filed on May 22, 2020, now Pat. No. 11,392,595, which is a (Continued)

(51) Int. Cl.
*G06F 17/30* (2006.01)
*G06F 7/14* (2006.01)
(Continued)

(52) U.S. Cl.
CPC .......... *G06F 16/24578* (2019.01); *G06F 7/14* (2013.01); *G06F 16/215* (2019.01);
(Continued)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 5,822,720 A    10/1998  Bookman et al.
6,275,820 B1 *  8/2001  Navin-Chandra .... G06F 16/951
(Continued)

FOREIGN PATENT DOCUMENTS

JP    2005-182817    7/2005
WO    WO-2006/104951 A1    10/2006

OTHER PUBLICATIONS

International Search Report and Written Opinion for International Application No. PCT/US07/04033 dated Feb. 15, 2008 (7 pages).
(Continued)

*Primary Examiner* — Hung D Le
(74) *Attorney, Agent, or Firm* — Wilmer Cutler Pickering Hale and Dorr LLP

(57) ABSTRACT

Techniques for determining relevant electronic content in response to queries is disclosed. According to an exemplary embodiment of the present disclosure, the techniques may be realized as a computer implemented method for determining relevant electronic content in response to a query. The method may comprise: receiving a query from a user device; categorizing the query to identify one or more relevant electronic content sources; formatting the query according to one or more electronic content source specifics for the one or more electronic content sources; transmitting the formatted query to the one or more electronic content sources; merging results in response to the formatted query to the one or more electronic content sources; merging results based at least in part on one or more factors; and formatting the results for delivering to the user device.

25 Claims, 6 Drawing Sheets

Related U.S. Application Data continuation-in-part of application No. 11/925,354, filed on Oct. 26, 2007, now abandoned.

(60) Provisional application No. 60/863,088, filed on Oct. 26, 2006.

(51) Int. Cl.
*G06F 16/215* (2019.01)
*G06F 16/242* (2019.01)
*G06F 16/2457* (2019.01)
*G06F 16/248* (2019.01)
*G06F 40/30* (2020.01)

(52) U.S. Cl.
CPC .......... *G06F 16/242* (2019.01); *G06F 16/248* (2019.01); *G06F 40/30* (2020.01)

(56) References Cited

U.S. PATENT DOCUMENTS

| | | | |
|---|---|---|---|
| 6,370,527 B1 * | 4/2002 | Singhal | G06F 16/951 |
| 6,446,083 B1 | 9/2002 | Leight et al. | |
| 6,601,061 B1 | 7/2003 | Holt et al. | |
| 6,728,704 B2 * | 4/2004 | Mao | G06F 16/951 |
| 6,738,764 B2 | 5/2004 | Mao et al. | |
| 6,795,820 B2 * | 9/2004 | Barnett | G06F 16/951 |
| 6,895,430 B1 | 5/2005 | Schneider | |
| 6,955,298 B2 | 10/2005 | Herle | |
| 7,181,438 B1 | 2/2007 | Szabo | |
| 7,409,402 B1 | 8/2008 | Chan et al. | |
| 7,962,464 B1 * | 6/2011 | Brette | G06F 16/256 |
| | | | 707/706 |
| 9,348,880 B1 | 5/2016 | Kramer et al. | |
| 2002/0133626 A1 | 9/2002 | Turnbull | |
| 2003/0212673 A1 * | 11/2003 | Kadayam | G06F 16/9532 |
| 2004/0030690 A1 | 2/2004 | Teng et al. | |
| 2004/0059708 A1 | 3/2004 | Dean et al. | |
| 2004/0153440 A1 * | 8/2004 | Halevy | G06F 16/2471 |
| 2004/0249789 A1 | 12/2004 | Kapoor et al. | |
| 2004/0267725 A1 | 12/2004 | Harik | |
| 2005/0096997 A1 | 5/2005 | Jain et al. | |
| 2005/0114306 A1 * | 5/2005 | Shu | G06F 16/9535 |
| 2005/0131872 A1 | 6/2005 | Calbucci et al. | |
| 2005/0149496 A1 * | 7/2005 | Mukherjee | G06F 16/24575 |
| 2005/0222989 A1 | 10/2005 | Haveliwala et al. | |
| 2005/0256766 A1 | 11/2005 | Garcia et al. | |
| 2006/0036598 A1 * | 2/2006 | Wu | G06F 16/9538 |
| | | | 707/999.005 |
| 2006/0047648 A1 | 3/2006 | Martin | |
| 2006/0053174 A1 | 3/2006 | Gardner et al. | |
| 2006/0075120 A1 | 4/2006 | Smit | |
| 2006/0120411 A1 | 6/2006 | Basu et al. | |
| 2006/0173814 A1 | 8/2006 | Jung | |
| 2006/0212350 A1 | 9/2006 | Ellis et al. | |
| 2007/0022103 A1 | 1/2007 | Rys et al. | |
| 2007/0027839 A1 | 2/2007 | Ives | |
| 2007/0038601 A1 | 2/2007 | Guha | |
| 2007/0150344 A1 | 6/2007 | Sobotka et al. | |
| 2007/0192300 A1 | 8/2007 | Reuther et al. | |
| 2007/0244750 A1 | 10/2007 | Grannan et al. | |
| 2007/0244866 A1 | 10/2007 | Mishkanian et al. | |
| 2007/0294220 A1 * | 12/2007 | Tabraham | G06F 16/3331 |
| | | | 707/E17.069 |
| 2008/0009268 A1 * | 1/2008 | Ramer | H04L 67/53 |
| | | | 707/E17.109 |
| 2008/0097982 A1 | 4/2008 | Gupta | |
| 2009/0006543 A1 * | 1/2009 | Smit | G06F 3/0481 |
| | | | 707/E17.108 |
| 2009/0222444 A1 * | 9/2009 | Chowdhury | G06F 16/3325 |
| | | | 707/999.005 |
| 2011/0238662 A1 * | 9/2011 | Shuster | G06F 16/248 |
| | | | 707/E17.071 |
| 2015/0242464 A1 | 8/2015 | Nguyen et al. | |
| 2015/0347543 A1 | 12/2015 | Sinha et al. | |
| 2016/0357756 A1 | 12/2016 | Gelfand et al. | |

OTHER PUBLICATIONS

International Search Report and Written Opinion for International Application No. PCT/US07/22688 dated Apr. 8, 2008, (5 pages).

\* cited by examiner

TECHNIQUES FOR DETERMINING RELEVANT ELECTRONIC CONTENT IN RESPONSE TO QUERIES

CROSS-REFERENCE TO RELATED APPLICATION

This application is a continuation of U.S. patent application Ser. No. 16/882,237, filed May 22, 2020, which is a continuation-in-part of U.S. patent application Ser. No. 11/925,354, filed Oct. 26, 2007, which claims priority to U.S. Provisional Patent Application No. 60/863,088, filed Oct. 26, 2006, each of which is hereby incorporated by reference in their entirety as if fully set forth herein.

FIELD OF THE DISCLOSURE

The present disclosure relates generally to computerized techniques for information retrieval, and more particularly to techniques for determining relevant electronic content in response to queries.

BACKGROUND INFORMATION

Inexpensive computer and networking technologies have made digital content accessible to millions of users via wired and wireless networks. The millions of users are potential targets of electronic content and media creators who are trying to deliver electronic content to the millions of users. Creators may work with intermediaries, which then provide electronic content to systems that perform electronic content delivery. Online electronic content delivery is therefore an opportunity to deliver relevant electronic content to users via wired and wireless networks.

Currently, online electronic content delivery systems may be based on text and data search technologies, which have provided significant practical and commercial value and also resulted in a proliferation and commoditization of electronic content search and retrieval.

Text and data search technologies may be implemented in electronic content networks, which may refer to computer programs designed to index, store, and retrieve information based on instructions from the user. Most contemporary electronic content networks are designed to pre-index a collection of resources (e.g. document, image, web site), then in response to a query (e.g., a request with one or more keywords), examine collections in one or a group of computers for electronic content that satisfies the query and return an ordered list of possible matches to the user as a results set. This results set normally contains, at a minimum, the locations of relevant electronic content. Many times, this result list may also include a title, a synopsis, pricing, and/or other metadata, where meaningful. A result item indicating relevance ranking, how closely the content matches the query, may be explicitly returned or may be given implicitly in the order of items in the results set, with the most relevant item at the top of the list. Rankings may be based on a numerical similarity scoring value or one of many possible metrics previously computed against the content and stored in a full-text or database index. An online electronic content delivery system may be implemented by electronic content networks, which works with either internal electronic content collections or external electronic content collections. To be successful, an online electronic content delivery system must maintain and improve the relevance of electronic content delivered to the user.

The changing nature of digital information access plays a part in increasing the value of precision. In addition to traditional content access via stationary computers, there has been an explosive proliferation of internet access using mobile computing devices such as laptops, personal digital assistants (PDAs), and mobile telephones. This proliferation is markedly changing the nature of content access while content providers reformat and reorganize their content for mobile access. While a desktop computer user can comfortably access online information, using multiple tries and browsing, mobile computing users are generally limited by small screen and input ergonomics, location-specificity, and their own mobility. Due to these constraints, mobile computing users are less likely to want to receive all possibly relevant electronic content, and more likely to want specific electronic content immediately, with the highest possible precision in the first five to ten entries of the results set. For the same reasons, mobile users also require the shortest path to their desired content. Therefore, electronic content links should take the user directly to the content rather than to an electronic content provider site.

As there is a plethora of competing electronic content providers available, it is a difficult decision to choose one that will satisfy all the needs of the online electronic content delivery system. Electronic content providers generally maximize their return on investment by specializing in geographic regions, electronic content types, or publishing medium. Choosing one or more electronic content providers to provide electronic content may be a challenging task. For example, an online electronic content delivery system may be run by a multi-national provider with multiple publishing vehicles. Both technical and business relationships may influence partner selection and electronic content inclusion for the online electronic content delivery system. Thus, the online electronic content delivery system may be forced to have a flexible solution. For example, one solution may be to choose the electronic content providers that are best of breed for a particular electronic content type, reaching down to regional and local providers when they are available, supplementing where necessary with large-scale, general providers. A more flexible solution, which may be used on top of the first solution, is to submit query to multiple electronic content providers and either return the most useful electronic content or merge the multiple electronic content result sets based on the relevance ranking.

Applicable electronic content network query and indexing architectures for implementing the more flexible solution described above may be federated electronic content system. A federated electronic content system may combine results from more than one search, with each search typically being conducted over heterogeneous content sources (e.g., full-text and/or multimedia electronic content provided by different electronic content distributor). However, technically, having the more flexible solution with multiple electronic content providers would appear to be an integration nightmare for developers because each electronic content provider may have specific requirement to be integrated with an online electronic content delivery system as an electronic content distributor. Moreover, some electronic content providers may have an exclusivity requirement, which precludes merging their result items with result items from other electronic content providers. Therefore, to avoid the technical and/or contractual difficulties for integration, some online electronic content systems may not take advantage of the federated electronic content systems and may compromise the relevancy of the electronic content by sticking with large-scale, general providers.

Another obstacle for implementing a federated electronic content system may be the scope of relevancy ranking. For a federated electronic content system to be maximally precise, it should find the resources that score highest with respect to the metacollection (e.g., the combined electronic content collections of searched distributors), not necessarily those that score highest with respect to the individual source in which they reside. For example, in a federated electronic content system query over the combination of two different electronic content distributors: sports and computer hardware; if the query contains the term "games," an incorrect implementation may give undue weight to sports games that appear in the sports collection. The practical impacts of this effect are substantial to the extent that a metacollection is used to cull information from diverse sources, each with a different specialty or focus.

Other challenges to federated electronic content system functionality may also be present. Different electronic content distributors may index their electronic content collections using different algorithms or by processing the same algorithms against different sections of text and/or metadata. Thus, local electronic content distributor calculated ranking statistics may not be compared directly when combining results sets. Moreover, different electronic content distributors may contain overlapping electronic content collections, which may result in the same electronic content item appearing in results sets from both sources. Traditional de-duplication algorithms remove all duplicates based on a metadata field value or set of field values, which may not be the desired action. Further, various electronic content distributors may contain similar electronic content but include varying depth of electronic content (extensiveness of the collection) or may vary in response characteristics (latency, percent uptime). These variations can negatively impact the user experience by generating insufficient results or by not responding before system or user-perceived timeouts. Additionally, there may be wide variation in relevance of a content collection to the query. There may be times that not all available electronic content distributors contain collections sufficiently relevant to warrant inclusion in the metacollection.

In view of the foregoing, it may be understood that there are significant problems and shortcomings associated with current online electronic content delivery technologies.

SUMMARY OF THE DISCLOSURE

Techniques for determining relevant electronic content in response to queries is disclosed. According to an exemplary embodiment of the present disclosure, the techniques may be realized as a computer implemented method for determining relevant electronic content in response to a query. The method may comprise: receiving a query from a user device; categorizing the query to identify one or more relevant electronic content sources; formatting the query according to one or more electronic content source specifics for the one or more electronic content sources; transmitting the formatted query to the one or more electronic content sources; merging results in response to the formatted query to the one or more electronic content sources; merging results based at least in part on one or more factors, and formatting the results for delivering to the user device In accordance with other aspects of this exemplary embodiment of the present disclosure, the user device may comprise one or more of an internet-enabled input device, an internet or voice-enabled mobile device, a voice-enabled input device, a computer, and a kiosk.

In accordance with further aspects of this particular exemplary embodiment, the one or more factors may comprise one or more global factors, local factors, editorial rating, response reliability, response latency, content relevance, content extensiveness or coverage, user preferences, usage statistics, query frequency, category frequency, distributor preferences, recommendation statistics, user-generated ratings, business relationships, user demographic characteristics, location, language, social networks, social groups, personalization characteristics, page size, graphic, text elements, source rating, reliability factor, business rules, business relationships, marketing goals, local ranking scores, source ordering values, source-specific general scores, statistics associated with results item textual or non-textual analysis, statistics associated with data or text mining analyses, statistics associated with data or textual clustering, statistics associated with non-textual pattern analysis, statistics associated with device specifics and/or statistics associated with formatting specifications.

In accordance with additional aspects of this particular exemplary embodiment, the query may be classified into a category in one or more taxonomy or controlled vocabulary.

In accordance with one aspect of this particular exemplary embodiment, the method may further comprise dynamically computing one or more local ranking statistics for each results item related to one or more terms associated with the query and related to metadata in the query context in response to the query, at each electronic content source.

In accordance with another aspect of this particular exemplary embodiment, the method may further comprise: computing at least one global and/or one local statistic related to one or more content items in the results sets, determining one or more relevancy scores for the results items from the one or more electronic content sources in accordance with the at least one global and/or one local statistic, computing a normalization factor, normalizing the one or more relevancy scores in accordance with the normalization factor, and combining the results into a single results set based on an ordering determined by the normalization factor.

In accordance with yet another aspect of this particular exemplary embodiment, the method may further comprise: storing results from each electronic content source in one or more caches, accessing the one or more caches to retrieve existing results, and formatting the retrieved existing results based on one or more query context parameters.

In accordance with still another aspect of this particular exemplary embodiment, categorizing the query occurs dynamically at the time query is received.

In accordance with a further aspect of this particular exemplary embodiment, the method may further comprise: identifying one or more duplicate result items. Moreover, the method may comprise removing the one or more duplicate result items according to one or more of user preference, device preference and distributor preference.

Alternatively, the method may comprise retaining the one or more duplicate results according to one or more of user preference, device preference and distributor preference.

In accordance with a yet further aspect of this particular exemplary embodiment, a computer readable media may comprise code to perform the acts of the method.

In another particular exemplary embodiment, the techniques may be realized as a system for determining relevant electronic content in response to a query. The system may comprise: a receiving module for receiving a query from a user device, a categorizing module for categorizing the query to identify one or more electronic content sources, a formatting module for formatting the query according to one or more electronic content source specifics for the one or more electronic content sources, a transmitting module for transmitting the formatted query to the one or more electronic content sources, a merging module for merging results in response to the formatted query from the one or more electronic content sources based at least in part on one or more factors, and a results module for formatting the results for delivering to the user device.

In accordance with other aspects of this exemplary embodiment of the present disclosure, the user device may comprise one or more of an internet-enabled input device, an internet or voice-enabled mobile device, a voice-enabled input device, a computer, and a kiosk.

In accordance with further aspects of this particular exemplary embodiment, the one or more factors may comprise one or more global factors, local factors, editorial rating, response reliability, response latency, content relevance, content extensiveness or coverage, user preferences, usage statistics, query frequency, category frequency, distributor preferences, recommendation statistics, user-generated ratings, business relationships, user demographic characteristics, location, language, social networks, social groups, personalization characteristics, page size, graphic, text elements, source rating, reliability factor, business rules, business relationships, marketing goals, local ranking scores, source ordering values, source-specific general scores, statistics associated with results item textual or non-textual analysis, statistics associated with data or text mining analyses, statistics associated with data or textual clustering, statistics associated with non-textual pattern analysis, statistics associated with device specifics and/or statistics associated with formatting specifications.

In accordance with additional aspects of this particular exemplary embodiment, the query may be classified into a category in one or more taxonomy or controlled vocabulary.

In accordance with one aspect of this particular exemplary embodiment, the system may further comprise a module for dynamically computing one or more local ranking statistics for each results item related to one or more terms associated with the query and related to metadata in the query context in response to the query, at each electronic content source.

In accordance with another aspect of this particular exemplary embodiment, the system may further comprise: a module for computing at least one global and/or one local statistic related to one or more content items in the results sets, wherein one or more relevancy scores are determined for the results items from the one or more electronic content sources in accordance with the at least one global and/or one local statistic; and a module for computing a normalization factor, wherein the one or more relevancy scores are normalized in accordance with the normalization factor; and the results are combined into a single results set based on an ordering determined by the normalization factor.

In accordance with yet another aspect of this particular exemplary embodiment, the system may further comprise one or more caches for storing results from each electronic content source. The one or more caches may be accessed to retrieve existing results; and the retrieved existing results may be formatted based on one or more query context parameters.

In accordance with still another aspect of this particular exemplary embodiment, categorizing the query occurs dynamically at the time query is received.

In accordance with a further aspect of this particular exemplary embodiment, one or more duplicate results may be identified. Moreover, the one or more duplicate results may be removed according to one or more of user, device, and distributor preferences. Alternatively, the one or more duplicate results may be retained according to one or more of user, device, and distributor preferences.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the appended drawings. These drawings should not be construed as limiting the present disclosure, but are intended to be exemplary only.

DETAILED DESCRIPTION OF EXEMPLARY EMBODIMENT(S)

Figure 1:
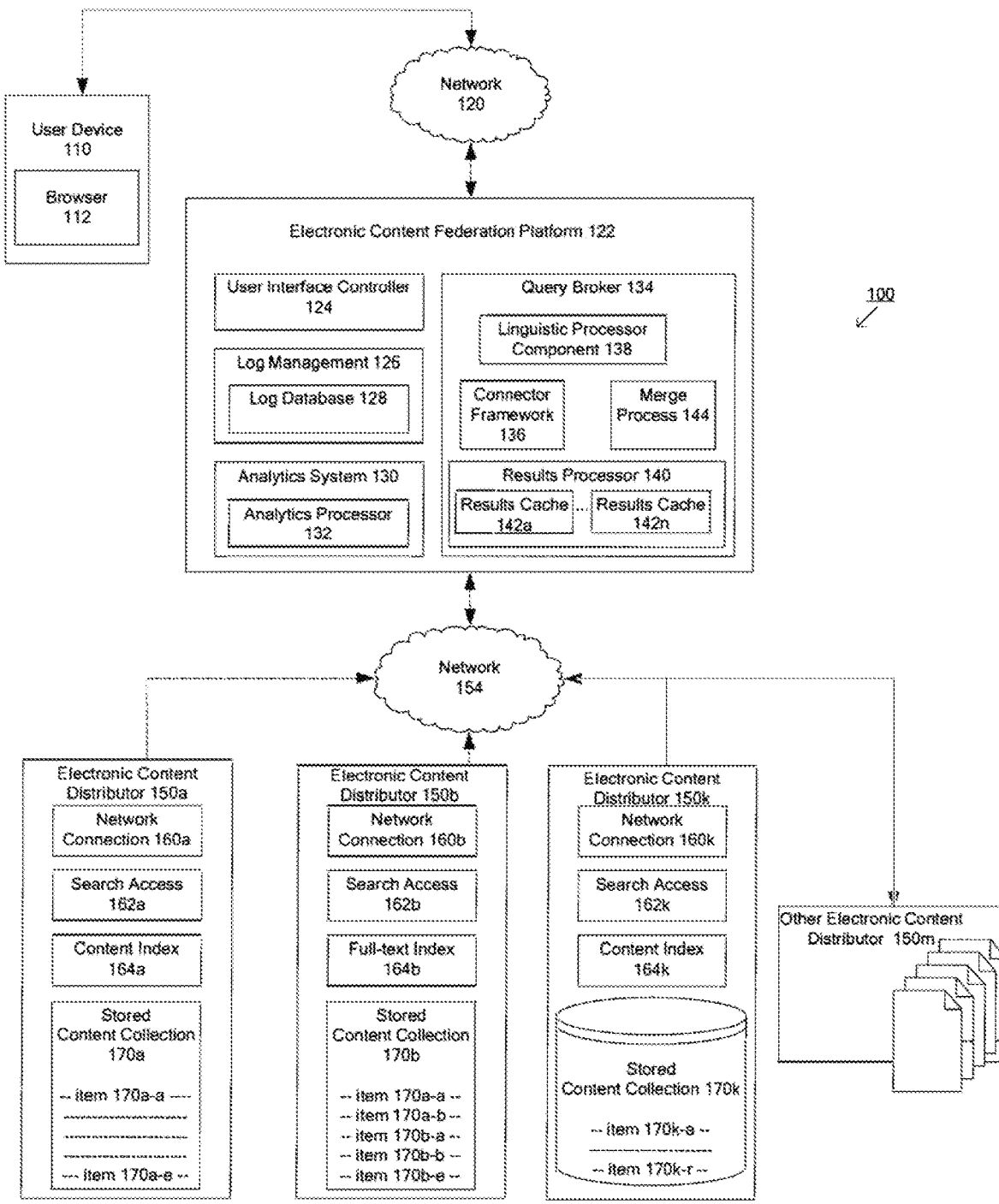
FIG. 1 is an exemplary diagram of a system for federated electronic content searching to multiple electronic content sources, according to an embodiment of the present disclosure.

The various embodiments of the present disclosure are directed to returning electronic content search results in a manner that maximizes results relevance while minimizing user perceived latency and platform resources, including consumed memory, processing, and network requirements. These qualities become increasingly important as the result set sizes and number of sources increase.

The following definitions are merely exemplary and referenced herein to illustrate the various embodiments of the present disclosure described below. The embodiments and scope of the disclosure are not limited by the definitions set forth below.

Electronic content: content adapted to be delivered digitally through a network. The electronic content may be textual, audio, video, or any combination thereof. Any person, organization, company that may want to send electronic content to users of an electronic device may be referred to as electronic content providers. Also, distributors of electronic content in a network environment may be referred to as electronic content distributors, which includes electronic content creators that produce and provide electronic content.

Electronic content network: may refer to computer programs designed to index, store and retrieve electronic content information based on instructions from the user via a query. A process that executes an individual search against a single collection is called an electronic content network. A process that executes a search against multiple electronic content networks and/or databases and combines results is known as a federated electronic content management system.

A method of ranking results may involve determining a relevance score for a resource (e.g., resource, website, and image) in view of a query. A similarity score may be calculated for the query utilizing a feature vector that characterizes attributes and query words associated with the result. A rank value may be assigned to the result based on the relevance score, similarity score and/or other factors and criteria. In addition, electronic content relevancy may be improved by adaptively ranking, based on prior behavior of users and resources returned from an electronic content network, electronic content distributor, or other content source. More particularly, prior behavior of users may be assessed to determine a rate at which to apply adaptive correction for a given query.

Results lists are merged with a goal of placing the most relevant entries first for the user's convenience. To reduce the associated computational overhead, lists may not be merged based on an examination of every single entry. Rather, the lists may be merged based on an examination of a smaller number of entries from each list. A subset of entries may be selected from each list and the lists may be merged according to these subsets, rather than upon an evaluation of every single entry of every single list. The subsets may be selected according to a technique for selecting a few items out of a larger group. For example, a number n may be chosen and the top n resources may be selected from each list. According to another example, a number may be again chosen where the merging algorithm selects n resources that are uniformly spaced within each result list. According to yet another example, a number may be chosen and n resources may be selected at random from each list.

A scoring value may be determined for each entry in the various subsets selected. Scoring values may be numbers that typically represent how closely the entry matches the query, where certain number ranges indicate an entry that is likely to be relevant to the user. A representative score of all scoring values may be determined. The representative score may be an arithmetic average or a value proportional to the average for a set of scoring values.

All entries from all lists may then be merged or ranked based on at least the representative score for each list. Once each result list has a representative score assigned, it may be merged with the other lists accordingly. For example, entries may be merged by selecting the list with the highest representative value (e.g., highest average scoring value). The first entry on the list that has not already been selected may then be picked. That list's representative value may then be decremented by a fixed amount and the process may be repeated until all entries have been picked. If any representative value drops below zero after decrementing, it may be reset to its initial value or a predetermined value.

According to another example, entries may be merged using a probabilistic approach where each list may be assigned a probability value equal to its representative value's percentage of the total representative values for all lists. Lists may then be selected according to their probability value, with lists having higher probability values being more likely to be selected. When a list is selected, the first entry on that list that has not already been selected is picked. This process may be repeated, with the total representative value being revised when all entries of a list are picked.

Content Source: may refer to a publisher having collections of digital or non-digital content available via a network. Electronic content distributors may be referred to as content sources.

(Content) Source Ratings may refer to scores used to measure the relative usability of content sources for types of queries. Content source ratings may also be calculated by including content factors such as extensiveness or coverage, classification reliability, content quality and/or other information that affects the source's results relevance. Ratings may also be affected by business relationships and usage patterns. For example, a business relationship between a content source and a distributor may increase a source's rating in order to either choose a source over other sources in the source library, or to give the content source results items preference over other source results in the combined results set. Sources with a high percentage of no results returned may have a lower rating than one wherein a high percentage of queries have results items returned.

Source ratings may also consider performance factors such as latency, response reliability and/or other criteria. For example, reliability may refer to percentage of uptime for the source in an average one-month period (or other time period). Latency may be measured as the time for query transmission by the query broker system to the content source plus the return trip time for the results set from the source back to the query broker system. For example, a source rating may be calculated by combining objective measures of the reliability of the source in responding to queries and the response latency with subjective measures of content coverage. For example, sources that are available 99% of a 24 hour day may have a higher source rating than those which are only available 93% of the day.

In addition, source ratings may be updated in response to variety of factors, such as, but not limited to, a query or set of queries, user traffic patterns, source responses, and/or advertising/marketing campaign considerations, using adaptive processes that depend on responses to prior queries, user choices, or other dynamic events.

Query: may refer to a request that describes or identifies information or data being sought by the user. The query may include various combinations of text, non-text, and/or user selected categories. For example, queries may include keywords (e.g., terms, phrases, natural-language sentences), as well as non-text queries (e.g. multimedia such as pictures or audio clips, and/or numerical queries such as auction bids, purchase prices, or travel dates), and/or categories (e.g. music genres such as Rock, Pop, or Urban).

Various combinations of query types and formats may be applied. For example, in the case of a travel reservation, a query may include a date range, departure and destination city pair and/or a number of people traveling. In the case of an audio file, the query may include verbal or musical phrases as well as artist names, song titles, etc. In more complex scenarios, a query may be characterized in terms of stock quotes, stock price derivatives, signal patterns, or isobars.

The user may transmit a query through a remote device, such as a phone, PDA and/or other mobile device. Further, the user may use a computer or other communication device to transmit a query.

Query Context: may include demographic information, such as user sex, age, and marital status; social networking information such as community, locale, group memberships;

and/or other data may also be received by an electronic content network. A query context may include other user specifics such as language preferences, display preferences, time/date data and/or other information. A query context may include type of device (e.g., mobile phone, laptop computer, PDA, game console), device settings/limitations (e.g., size, graphics, audio, video, memory), response display settings (e.g., font, color). A query context may include a user's current location and/or preferred location, which may be used to preference relevant search results for location-related queries. For example, a user may search for a nearby pizzeria. The electronic content distributor or electronic content network may automatically return a list of pizza restaurants closest to the user's current location.

The query context may be automatically retrieved from the device and included in the query. In addition, the user may access a webpage or other user interface to provide and/or update user preferences, settings and/or other data to be included in the context.

Stored Query: The user may pre-program frequent searches, such as stock quotes, weather, update on favorite celebrities, etc. with no change to the underlying technology.

Results Item: an atomic piece of information. A results item is returned by an electronic content distributor or electronic content network and is used to refer to a specific document. Results items may include location of the information resource, and various other metadata values such as description, title, price, etc. Each electronic content returned by a search may be referred to a result item.

Results Set: A list of results items returned from an electronic content distributor or electronic content network in response to a query.

Categorization: may be defined as the placement of entities in groups, potentially hierarchical structured as taxonomies, whose members bear some similarity to each other. Categorization systems may involve the assignment to a resource of one or more group labels intended to represent the intellectual, functional, or conceptual content of that resource. These labels are usually drawn from a controlled vocabulary that normalizes the terminology and provides for communication between the information retrieval system and the individual or several information retrieval systems by specifying a set of authorized terms or labels that can be used to pose search queries.

Taxonomy: may be a hierarchically-arranged controlled vocabulary used to organize content in a collection. Internet electronic content distributors or electronic content networks may have one or more associated taxonomies to facilitate browsing search of the content collection. Web application developers and marketing may have split the organization of resources into two separate representations to satisfy the organizational uses of different stakeholders. A single taxonomy node is called a taxon. The plural of taxon is taxa.

Reference Taxonomy: may be fine-grained, monotonically expanding taxonomy used as a structure for manual or machine classification of the content items stored in the local collection.

Display Taxonomy: may be a subset of the reference taxonomy and is used for display to individuals accessing content. This display taxonomy may be more mutable than the reference taxonomy because it is used to highlight categories for individual browsing searches and content source staff may determine that it is more important to highlight one area of content this week and a different area next week. Even if the display taxonomy changes, the reference taxonomy will remain unchanged to avoid re-categorizing the entire content collection.

Source Taxonomy: may be the display taxonomy for a content source accessible by a federated electronic content system. In a federated electronic content system, there may be three levels of organization. For example, in addition to the display taxonomy viewable by individuals and a reference taxonomy level for organizing the resources available in the metacollection, the content source display taxonomies are indirectly available for user browsing.

The present disclosure relates in particular, to a method and system for a federated electronic content management system which categorizes the query and query context to choose the most relevant source(s) (e.g., electronic content distributors) from a set of multiple, distributed, heterogeneous electronic content sources to generate a combined search results set, ordered using source, user, distributor ratings and/or other factors with minimum latency to the user.

FIG. 1 is an exemplary diagram of a system 100 for federated electronic content searching to multiple electronic content sources, according to an embodiment of the present disclosure. The components of system 100 may be further duplicated, combined and/or separated to support various applications of the embodiments of the present disclosure. Additional elements may also be implemented in the system to support various applications.

System 100 is used to send a search query from User Device 110 to Electronic Content Federation Platform 122 to request a set of electronic content results items satisfying the user query. User Device 110 may include a computer input device containing a client or browser program 112 that allows users to access the Internet. User Device 110 may include a mobile device or other communication device, including a terminal, such as a kiosk or desktop computer. User Device 110 may communicate via Network 120, which may include the Internet or other network, to Electronic Content Federation Platform 122. Electronic Content Federation Platform 122 may operate in a client-server, peer-to-peer, and/or other configuration.

Electronic Content Federation Platform 122 may include a User Interface Controller 124. The User Interface Controller 124 may include a component that receives and packages a query. The component may receive a query as an HTTP request via a gateway and then package the query with a query context (e.g., locale, user agent, user preferences and login, if available), and send it as a query state object to an electronic content classification system within the User Interface Controller 124. The electronic content classification system may analyze the query context, determine the most appropriate electronic content format(s) and annotate the query state to include a ranked list of appropriate electronic content format(s). The electronic content classification system may then send the query state object outside the User Interface Controller 124 to a Query Broker 134 and wait for a return of one or more relevant, appropriately formatted electronic content. Once the electronic content classification system receives the electronic content, it may remove any inappropriately formatted electronic content and return the query state object to an electronic content delivery controller component in the User Interface Controller 124. The electronic content delivery controller component may extract the electronic content from the query state object, create an HTTP response (or other type of response, e.g., xHTML, cHTML, wml, XML, etc.) appropriately formatted for the user's device and application.

As described previously, the Electronic Content Federation Platform 122 may comprise a Query Broker 134. The Query Broker 134 performs electronic content source selection, results caches and merging source-specific result sets. The Query Broker 134 may communicate through Network 120 by wired or wireless network connection to user devices (e.g., User Device 110) and further communicate through Network 154 to electronic content sources (e.g., Electronic Content Distributor 150*a*, 150*b*, 150*k*,) and/or Other Electronic Content Distributor 150*m*, e.g. "on-deck" electronic content sources.

The Query Broker 134 may include various modules to perform functionality associated with searching, retrieving and/or other processing. For example, Query Broker 134 may include a Linguistic Processor Component 138, Connector Framework 136, Merge Process 144, Results Processor 140, Results Caches 142*a* . . . 142*n* and/or other module(s). The various components of system 100 may be further duplicated, combined and/or integrated to support various applications and platforms. In addition, the modules, caches and other components may be implemented across multiple systems, platforms, applications, etc. Additional elements may also be implemented in the system to support various applications.

Linguistic Processor Component 138 may dynamically classify queries. An embodiment of the present disclosure may provide dynamic classification of a user query and/or query state using a taxonomic structure organizing any of content publishers, location, content subject or function, and/or other relevant content distinctions. The Linguistic Processor Component 138 may extract preferences and metadata associated with a query. The categorization functionality of the Linguistic Processor Component 138 may select or identify a relevant electronic content source subset from a library of electronic content sources. By dynamically computing the set of sources relevant to the user's information request at the time a query is presented, an embodiment of the present disclosure maximizes precision while minimizing retrieval costs of non-relevant content. The selection of the relevant electronic content sources may be based on content coverage and electronic content type, publishing medium (web, mobile device), user behavior and location, group and user preferences (e.g. demographics, etc.), business relationships and/or other factors and considerations.

The Linguistic Processor Component 138 may reformat the query into the source-specific query language and Connector Framework 136 may transmit the reformatted query to the respective electronic content source(s) (e.g., Electronic Content Distributor 150*a*, 150*b*, . . . 150*k*). By reformatting the query into source-specific query language, more accurate results may be obtained more efficiently. Various source-specific query request input format may be implemented, such as, but not limited to, XML, Java, SQL and/or other formats. In response, results sets may be received from the respective electronic content sources by the Connector Framework 136.

Electronic Content Distributors 150*a* . . . 150*m* may facilitate information retrieval from their content collections using several modules. Electronic content sources may communicate through Network 160*a* . . . 160*m* by wired or wireless network connection to user devices or other programs. Search Access module 162*a* . . . 162*m* may provide for parsing the incoming query using the electronic content management system proprietary indexing algorithm, matching the query to the content index and returning results sets that include metadata such as the description and location of the matching electronic content items. Index 164*a* . . . 164*m* may include a storage mechanism and computer program that may include metadata, text and/or other attributes from the resources contained in the distributor's content collection. The Stored Content Collection modules 170*a* . . . 170*k* may include resources, multimedia, and/or other electronic content indexed by the electronic content management system, referenced by the metadata and accessible via the location listed in the results set.

The modules and other components of Electronic Content Distributors may be implemented across multiple systems, platforms, applications, etc. Additional elements may also be implemented in the Content Source systems to support various applications.

The Stored Content Collections may include electronic content data items such as electronic content items [170*a-a* . . . 170*a-e*], and [170*a-a*, 170*a-b*, 170*b-a*, 170*b-b*, 170*b-e*]. For example, electronic content items may appear in one collection, as in items [170*a-a* . . . 170*a-e*]. However, electronic content items may also appear in more than one collection, as depicted by the overlap of the electronic content sets [170*a-a*, 170*a-b*] in collections 170*a* and 170*b*. In such a case, multiple references to the same electronic content may appear in the results set of a federated electronic content management system which invokes both of these external distributors. This situation may exist when electronic content redistributors publish the same electronic content to their respective networks, varying the presentation to the user by various factors such as language, content ranking, organization, billing arrangement and/or other consideration. The Electronic Content Federation Platform 122 may further retain or remove duplicates in such a way as to create a fair representation of multiple collections.

According to an embodiment of the present disclosure, Connector Framework 136 may receive the results from the respective electronic content sources (e.g., electronic content distributors, databases, other sources of data, etc.) and further store the results in query/source-specific Results Caches 142*a* . . . 142*n*. A Results cache may contain the results set returned from an electronic content source in response to a specific query, e.g. keyword, term set, hummed phrase, or category. Results Caches may also be time-sensitive where the results become unusable after a predetermined period of time, such as a specified number of minutes or hours, to retain content freshness. Caches may also have an associated unique cache key which may include source identification, query or category terms, and/or other factors to facilitate reuse.

Query-specific caches (e.g., Results Caches 142*a* . . . 142*n*) may store results returned from electronic content sources 150*a* . . . 150*m* and store merged results sets for post-processing at Results Processor 140. Results Processor 140 may then compile and possibly cache the combined list to produce a single ranked results list for the user using Merge Process 144. The separate source-specific lists and the combined lists may be reusable within a configurable time period for responses to subsequent queries by the same or other users. The Results Processor 140 may also check the returned electronic content for consistency and quantity. For example, if fewer electronic content than requested were returned, the Results Processor 140 may augment the response with electronic content from an internal category-level cache and/or other source.

Merge Process 144 may merge different result sets into a single list (or other format) in an order based a configurable algorithm which may determine an order based on electronic content text, metadata, electronic content quality and delivery reliability, business relationships with the electronic content providers and/or other factors and considerations. For example, other factors may include: when a time threshold passes; or other condition is met. For example, an embodiment of the present disclosure may be directed to merging results, after waiting 100 ms for source responses, based on electronic content source ratings. In addition, the results may also be ranked based on internal content relevancy scores, and/or other result specific criteria. For example, after individual results are received, the Merge Process 144 may merge the source-specific results according to a merging algorithm or program, which may include local ranking scores, source ordering values, source-specific general scores and/or other source factors as well as result-based ranking, such as relevancy or accuracy, and usage factors such as demographics, traffic patterns, user personalization and community values, etc. The Merge Process 144 may retain or remove duplicate results according to user, device and/or other preferences or processes that may be applied to the results. After a single list (or the format) has been generated, the Query Broker 134 may then return a final electronic content set to the User Interface Controller 124, which may render the results appropriately for a mobile device and return the results through the network 120.

The Electronic Content Federation Platform 122 may further comprise a Log Management component 126 and an Analytics System 130. The Log Management component 126 may include a Log Database 128. The Log Database 128 may include tables used to organize access and click through traffic, query object changes, electronic content access, and account management. The Log Management component 126 may work with the Electronic Content Classification System of the User Interface Controller 124 to log the system behavior for analysis of system performance. As described previously, the incoming query and query context may be moved through the system as a query state object. This object may be logged at its initial creation where one or more of the following changes to the query state object may be logged: the appropriate electronic content formats, electronic content returned from the Query Broker 134, and delivery format.

Log Management component 126 may extract data for use in one of three main functions: User behavior (e.g., visits, click-through, etc.), system functionality (e.g., core debugging of application performance), and Account Management (e.g., electronic content providers, etc.).

The Analytics System 130 may include an Analytics Processor 132. The Analytics Processor 132 may analyze data stored in the Log Database 128 for usage and behavior, keyword frequency and pricing changes, category return on investment, electronic content provider performance, electronic content campaign performance and/or other activity. It may take into account user profiling, geo-targeting, time and day fluctuations and/or other data. The Log Management component 126 may also compile data for use by the Analytics System 130. For example, the Analytics Processor 132 may use the compiled data for Keyword Optimization (e.g., return on investment, major keywords, electronic content provider optimization) and/or other functions.

The Analytics System 130 may further include an Account Management module (not shown), which may provide reporting and billing functions. The Account Management module may manage one account per electronic content provider, provide login authentication, secure access to analytical reports generation by the Analytics Processor 130 and bill data generated by an internal billing sub-module. The Analytics System 130 may be a monetization component that tracks electronic content delivery, clicks for processing by the Analytics Processor 132 and/or other activity. The Analytics Processor 132 may be extended with adaptive learning processes to forecast the electronic content source which may contain the electronic content of highest value, for example. The Electronic Content Federation Platform 122 may then select or preference electronic content from that source, which may include some specific electronic content distributors and/or other sources.

An exemplary embodiment of the present disclosure may utilize system architecture to provide a more manageable engine to operator-based electronic content delivery for mobile data services. Additionally, the architecture allows for the creation of regionally focused search services using a common business and technical processes across electronic content systems and search services. The exemplary embodiment may be architected for integration ease, configurability, and scalability. Therefore, the exemplary embodiment may allow business as well as technical decisions to drive the choice of the external electronic content partners, and to move rapidly to take advantage of new opportunities.

For example, one exemplary embodiment of the present disclosure may provide the following: total control of the user experience; search listings, mobile sites and mobile services according to multiple services models, configurable for each distribution venue; maximized by ensuring all electronic content vehicles fully deliver in response to user behavior; minimized risk and reduce reliance on specific electronic content sources, maximizing leverage in the marketplace; major keyword Pay Per Click (PPClick) electronic content to users under the group brands; long tail keyword PPClick electronic content via a single request/response model that is fully integrated with the major keyword electronic content; ability to stay ahead of user requests through the rapid integration of new electronic content model services, such as Pay Per Action (PPAction) and Pay Per Call (PPCall), affiliate partners, and flat link services from emerging electronic content providers or emerging geographic regions; minimized capital, operating, and development expenditure on mobile sites, search listings, and mobile services by providing a hosted service with a single, simple API to all electronic content service providers; and rapid deployment of customized electronic content services.

One exemplary embodiment may implement features that include dynamic electronic content request categorization for maximizing the number of relevant electronic content returned from the electronic content distributor per request, usage and community modeling to increase electronic content relevance and maximize click through rates (CTR), electronic content distributor rating and request rotation, multi-distributor electronic content request responses, and total traffic analysis to focus future electronic content development.

In one exemplary embodiment, the electronic content distributor may be a vendor. In another exemplary embodiments, the electronic content provider may be an advertising agency. In another exemplary embodiment, the electronic content may be a video file, an audio file, an image, a word document, an electronic advertisement, a website link, or the like.

In another exemplary embodiment of present disclosure, an Electronic Content Federation Platform may provide a single request format for use by developers and may further dynamically reformat the request to support various electronic content provider request query language, parameter set, metadata mapping and/or other criteria.

In one or more exemplary embodiments of the present disclosure, an Electronic Content Federation Platform may also seamlessly leverage multiple electronic content provider taxonomy and electronic content classification systems to increase electronic content relevance and maximize marketing return on investment. Generally, return on investment may refer to the electronic content provider's ability to generate revenue from a given project(s) to offset costs associated with the development, implementation and maintenance of the project.

For example, electronic content may be integrated into an external electronic content provider by building a connector from the Electronic Content Federation Platform. The Electronic Content Federation Platform may serve client content alone or combine it with other electronic content provider as well as other content based on business rules determined by management and/or other factors. The Electronic Content Federation Platform may then automatically include major word electronic content and/or other electronic content, etc. in response to the requests.

In one or more exemplary embodiments of the present disclosure, an Electronic Content Federation Platform may support native language input and returns electronic content results in UTF-8 in real-time. For example, search results may be returned in UTF-8 (or other similar) format in real time, meaning that the results are returned to the user directly from an electronic content provider's content stores, as opposed to cached content.

Figure 2:
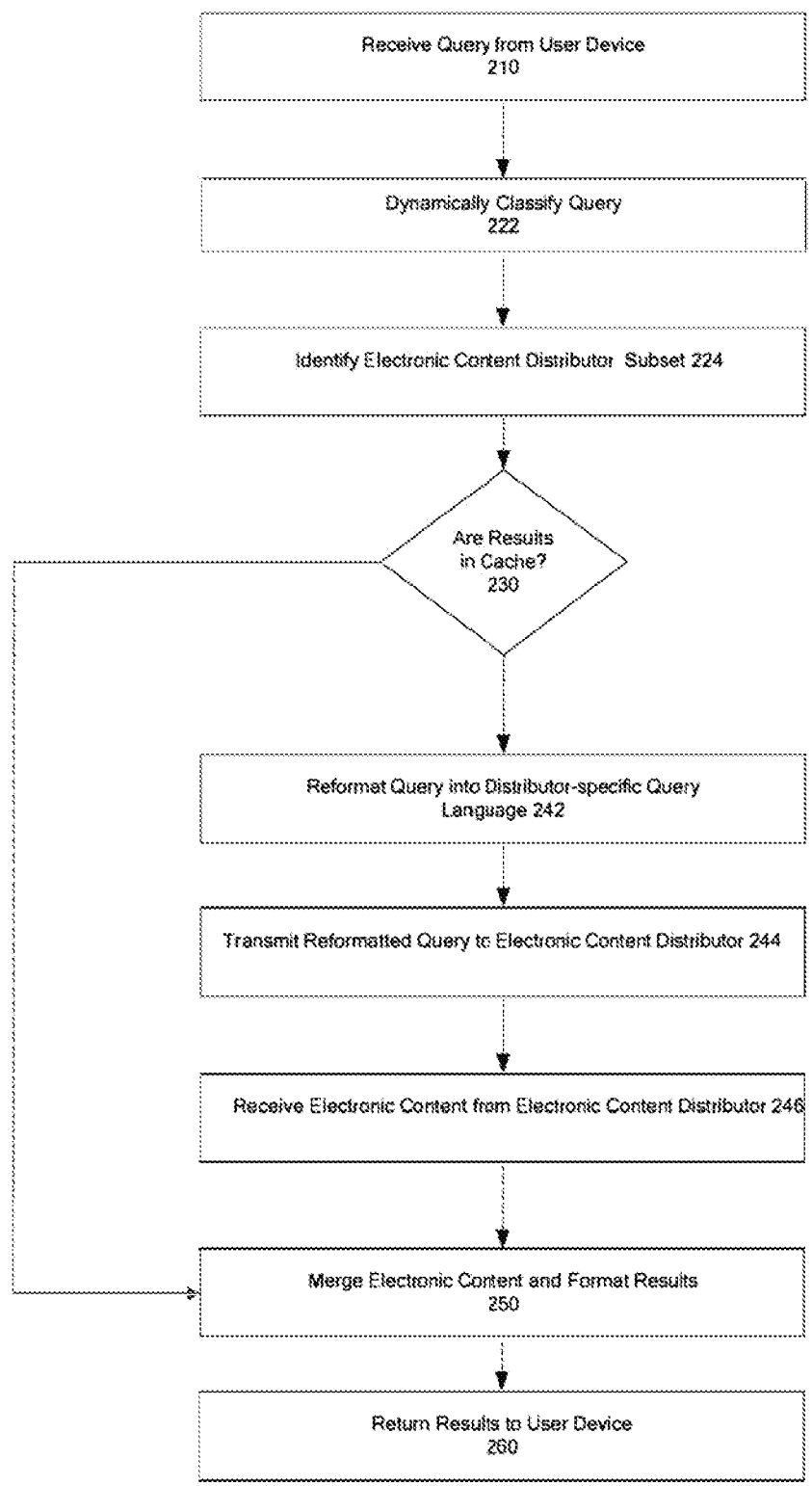
FIG. 2 is an exemplary flowchart illustrating a method for query execution, according to an embodiment of the present disclosure.

FIG. 2 is an exemplary flowchart illustrating a method for query execution, according to an embodiment of the present disclosure. A method of an embodiment of the present disclosure selects a relevant subset of possible electronic content sources available to an electronic content management system, such as a federated electronic content management system, sends a reformatted query to each electronic content source in the subset, receives and caches each results set, then merges the results sets into a single combined results set.

As shown by FIG. 2, a query may be received from a user at step 210. At step 222, the query may be dynamically classified against one or more taxonomies organizing the electronic content source library, electronic content subject and functional aspects, and/or user and operator characteristics. At step 224, an electronic content source subset may be identified from the available electronic content source library. At step 230, results caches may be checked for pre-existing results sets. If no results exist in the cache for the query and query context, the Query Processor proceeds through steps 242, 244, and 246. At step 242, the query may be reformatted into the source-specific query language(s) particular to the electronic content source subset. At step 244, the reformatted query may be transmitted to electronic content sources, such as electronic content distributors, electronic content networks, databases and/or other sources of data. At step 246, electronic content may be received from the electronic content sources and stored in local results caches. At step 250, results from electronic content sources may be merged and further reformatted. At step 260, the results may be returned for display to the user. While the steps of FIG. 2 illustrate certain steps performed in a particular order, it should be understood that the embodiments of the present disclosure may be practiced by adding one or more steps to the processes, omitting steps within the processes and/or altering the order in which one or more steps are performed.

An embodiment of the present disclosure provides dynamic categorization of a user query and/or query state against a pre-categorized library of electronic content sources. The query may be categorized at runtime by Query Broker 134, at step 222. For example, a user may search for mobile phone games using the keyword, "auto racing". For example, the Query Broker 134, at step 222, may classify the query as a "Mobile Game" query and thereby identify a set of mobile game electronic content sources. In addition, the granularity of the query category may be adjusted to refine the search results. For example, the query may be a request for games about auto racing. In this case, the query may be categorized as "Mobile Game" and "Action." Accordingly, an electronic content source subset may be identified as maximally relevant to the combination of the two categories. Other variations may be applied.

By dynamically computing a set of sources relevant to the user's information request at the time a query is presented, an embodiment of the present disclosure maximizes precision for the query. In addition, the amount of data transmitted over the network may be minimized over other federated electronic content management technologies, thereby providing efficient bandwidth utilization. Furthermore, topology of the federated electronic content source selection mechanism readily supports a multi-tier hierarchy of electronic content distributors and other sources, thereby facilitating the scalability of the search system to any number of electronic content collections, electronic content networks and/or other sources of data.

At step 224, a content source subset may be identified. The categorization functionality of the Query Broker 134 may select or identify a relevant electronic content source subset from a library of possible electronic content sources.

At step 230, one or more results caches may be checked. In accordance with an embodiment of the present disclosure, results caches may be checked for previously returned results. An embodiment of the present disclosure may be directed to retrieving results for a query from cache thereby allowing reuse of the results for identical and/or related queries from other users. As a result, network transmission may be minimized and the effects of network latency to the users may be reduced. Therefore, if it is determined that query results are already stored in a local internal or external cache, these results may be used directly or merged with results from other electronic content networks, at step 250 for return to the user.

If no results were in cache, at step 242, the query may be reformatted into source-specific query language. For example, the Query Broker 134 may reformat the query into the source-specific query language for one or more electronic content sources. At step 244, the reformatted query may be transmitted to electronic content sources.

At step 246, electronic content may be received from the respective electronic content sources. In addition, each electronic content source may pre-determine scores, ranking and/or other rating for the content in their respective collections pursuant to the query. Further, the results items may show an implicit ranking by being transmitted to the Query Broker 134 as an ordered results list. The Query Broker 134 may receive the results from the respective electronic content sources (e.g., electronic content distributors, electronic content networks, databases, other sources of data, etc.) and further store the results in local internal or external results caches. Local results caches may be specified by a query, a specific content source, a group of sources, the type of source and/or other categorizations.

At step 250, electronic content from the electronic content sources may be merged and further formatted. After individual results are received or when a time threshold passes, the program may merge the source-specific results according to a merging algorithm or program, which may include local ranking scores, source ordering values, source-specific general scores, usage scores, user or distributor scores, and/or other factors. At step 250, the combined results list is compiled to produce a single ranked results list for the user. The separate, source-specific and combined lists are also reusable within a configurable time period for response to subsequent queries by the same or other users. In addition, duplicate results may be retained or removed and other preferences may be applied to the results. The results may include an electronic content source reference with each result item to indicate the electronic content source. For example, an embodiment of the present disclosure may be directed to merging the results in an order based on various factors, which may involve source factors, such as electronic content quality and extensiveness, electronic content source latency and reliability, business relationships, externally determined quality ratings (such as Zagat ratings, etc.), individual and community usage patterns, and/or other ratings and calculations. In addition, the results may also be ranked based on text and metadata relevancy, and/or other result-specific criteria.

For example, at least one global statistic related to electronic content items in the results set may be computed. This may include a score normalization factor comprised of the results item rank and the source rating. In addition, electronic content relevancy scores for the results items from the electronic content sources may be determined, in accordance with the global statistic. Further, the scores may be normalized in accordance with the normalization factor for the metacollection, an external similarity scores, and the results metacollection items order as returned from the electronic content sources in accordance with the source statistic.

At step 260, the results may be displayed to the user. User device specifics and/or user preferences may be considered when displaying the results to the user. For example, as mobile devices may have screen size limitations, the results item description or title may be truncated and/or otherwise modified to accommodate the user's device and/or other preferences.

Figure 3:
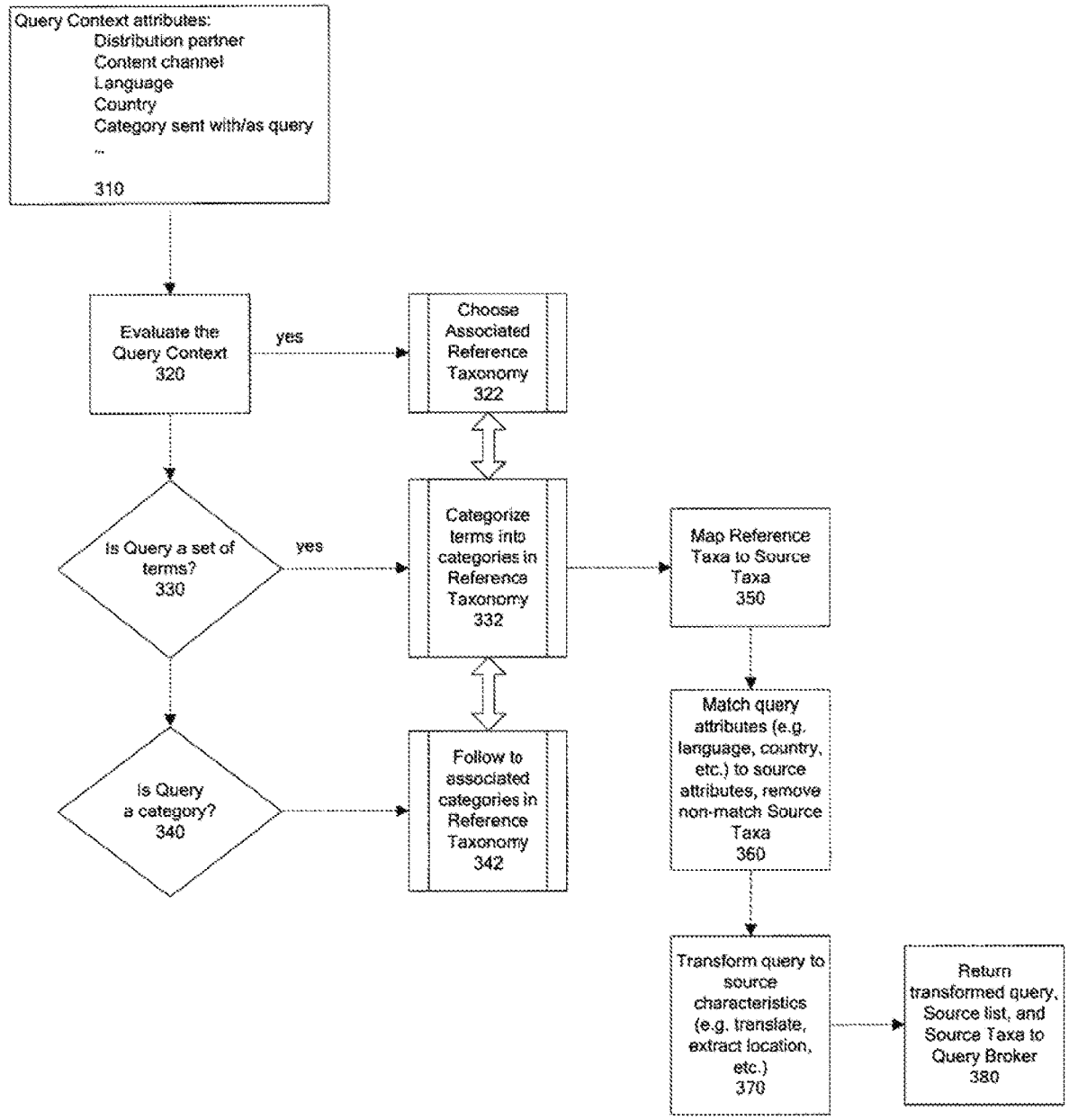
FIG. 3 is an exemplary flowchart illustrating a method for intelligent electronic content source selection, according to an embodiment of the present disclosure.

FIG. 3 is an exemplary flowchart illustrating a method for intelligent electronic content source selection, according to an embodiment of the present disclosure. An embodiment of the present disclosure is directed to identify a relevant electronic content source subset from an electronic content source library of electronic content distributors and databases. The categorization process may analyze the query and its attributes and identify a relevant subset of electronic content sources. Query Broker 134 may utilize a categorization process to assign a query to a relevant taxon or taxa in the reference taxonomy and choose the optimal set of related electronic content source taxa which uniquely identify electronic content sources.

At step 310, one or more query context attributes may be identified. For example, attributes may include distributor, vertical search channel, language, country, artist, title, price, and/or other metadata associated with the query and/or user.

At step 320, the computer program may evaluate the query context attribute values. Associated reference taxonomy may be selected, at step 322 in response to the vertical search selection and other context parameter values. The computer program may determine whether the query is a set of terms or a category, at step 330. Terms may refer to word(s), phrase(s), etc. If so, the terms may be assigned to categories in the associated reference taxonomy or taxonomies, at step 332 using a dynamic machine classification process. The computer program determines whether the query is a category from the display taxonomy, at step 340. If so, an associated category may be identified in the reference taxonomy, at step 342. At step 350, the selected reference taxonomy category may be related with the electronic content source taxon or taxa associated with each selected electronic content source. At step 360, the query and query context values may be transformed to match electronic content source metadata fields and values, which may involve translation, user preference extraction, etc. At step 370, query context attributes (e.g., language, country, etc.) may be matched to one or more electronic content source attributes and the context attribute names may be mapped to electronic content source attribute names. At step 380, the electronic content source taxa list, matching metadata attribute names and values and transformed query may be returned to the Query Broker 134.

Figure 4:
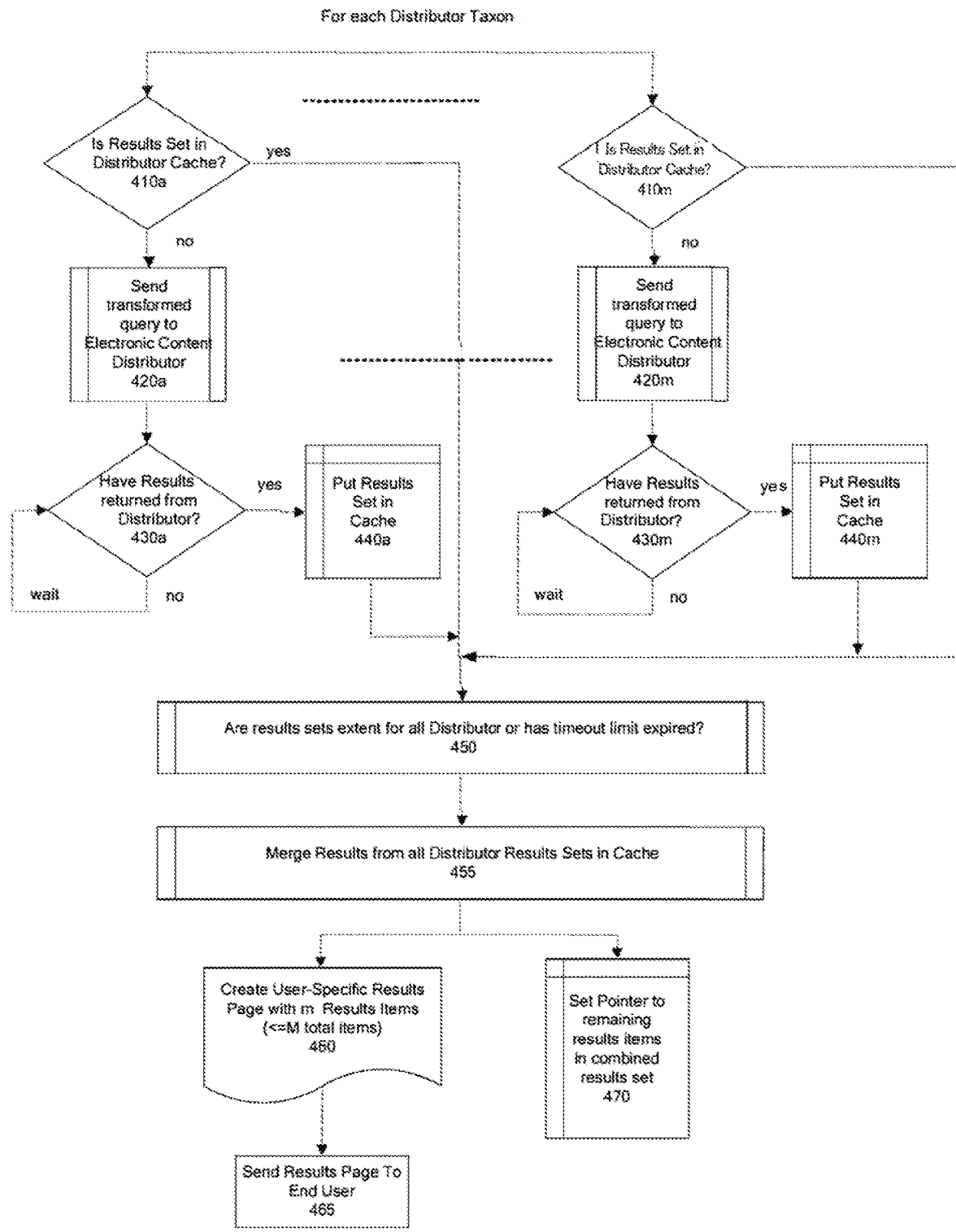
FIG. 4 is an exemplary flowchart illustrating a method for accessing, storing and merging electronic content result lists, according to an embodiment of the present disclosure.

FIG. 4 is an exemplary flowchart illustrating a method for accessing, storing and merging electronic content result lists, according to an embodiment of the present disclosure. As discussed above, a subset of electronic content sources may be identified and the associated taxon is returned to the query broker system. For each electronic content source and the query, it may be determined whether an existing result set resides in a results cache, at step 410*a* . . . 410*m* and 450. If results exist, they are merged at step 455 based on the incoming query context attribute values. At this step, previously stored results may be retrieved from the results cache(s).

If results do not exist, the query may be reformatted into an electronic content source-specific query language and transmitted to a respective electronic content source, at step 420*a* . . . 420*m*. The query broker system may wait for results from each electronic content source, at step 430*a* . . . 430*m*. A wait timeout, or other predetermined condition, may be implemented to ensure efficiency. Once the results are received, the results may be stored in the results cache, at step 440*a* . . . 440*m*. At step 450, it may be determined whether all electronic content sources have returned results or the timeout limit has expired. At step 455, all results items in cached results sets are merged into a single, combined results set based on the incoming query context attribute values. The merging algorithm may then cache the merged list to produce a single ranked results list.

As shown by step 460, additional processing may involve taking the top or next m items from the combined results set to create a user-specific results page. In addition, the Query Broker 134 may check the results list for duplicates and group, remove or retain them according to system and distributor preferences. This step may consider query context attributes such as, but not limited to, device specifics, user preferences, and/or distributor limitations in creating the results page. At step 465, the results page may be sent to the user via a wired or wireless communication channel. At step 470, a pointer may be set to the remaining results items in the combined results list (at the m+1th result item).

The merging process may calculate a global statistic for each electronic content results item in each results set returned by electronic content sources in response to a query. This global statistic is a function of two or more factors: the relevance of the result item to the query, represented by a similarity score or ranking determined by the electronic content source and included explicitly or implicitly with the results items; and external characteristics such as, but not limited to, a source rating, usage parameter values, user preference score, or distributor preference value.

Figure 5:
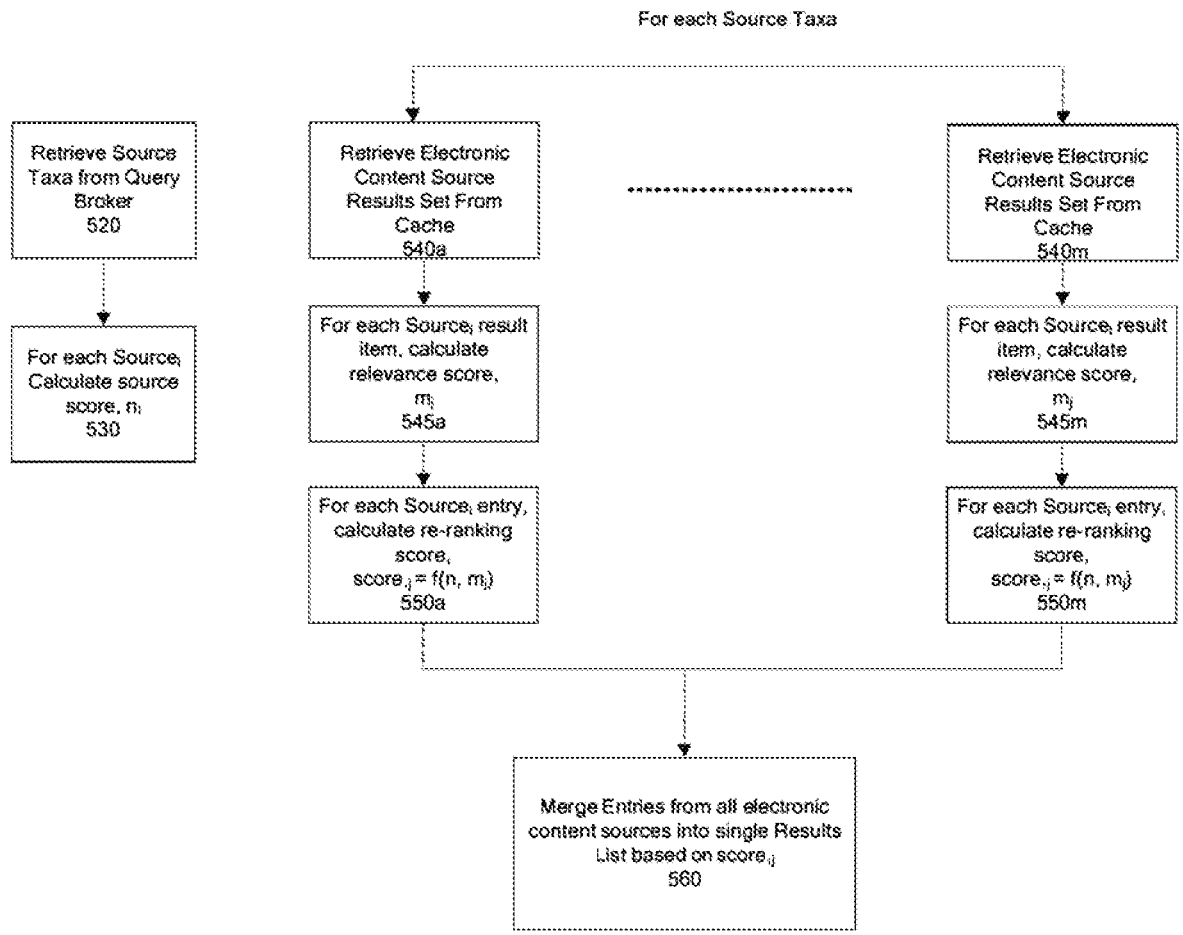
FIG. 5 is an exemplary flowchart illustrating a merging process, according to an embodiment of the present disclosure.

FIG. 5 is an exemplary flowchart illustrating a merging process using rank order as the results item score and source ratings to represent external characteristics, according to an embodiment of the present disclosure.

After all individual results are received, the Query Broker 134 may merge the results according to a merging algorithm which includes general scores (e.g., $n_j$) and results-specific relevance scores (e.g., $m_j$). For example, source taxa may be retrieved using taxa identifiers stored in the query context at step 520. At step 530, for each electronic content source, a source score (e.g., $n_i$) may be calculated from attribute values stored in each source taxon. For each electronic content source, results items are retrieved from the associated cache, at step 540a . . . 540m. For each electronic content source results item, an item score (e.g., $m_j$) may be determined, at steps 545a . . . 545m; and a reranking score (e.g., $score_{ij}=f(n_i, m_j)$) calculated, at steps 550a . . . 550m. The Query Broker 134 may compile the merged list using $score_{ij}$ to produce a single ranked results list for the user, as shown by step 560.

Figure 6:
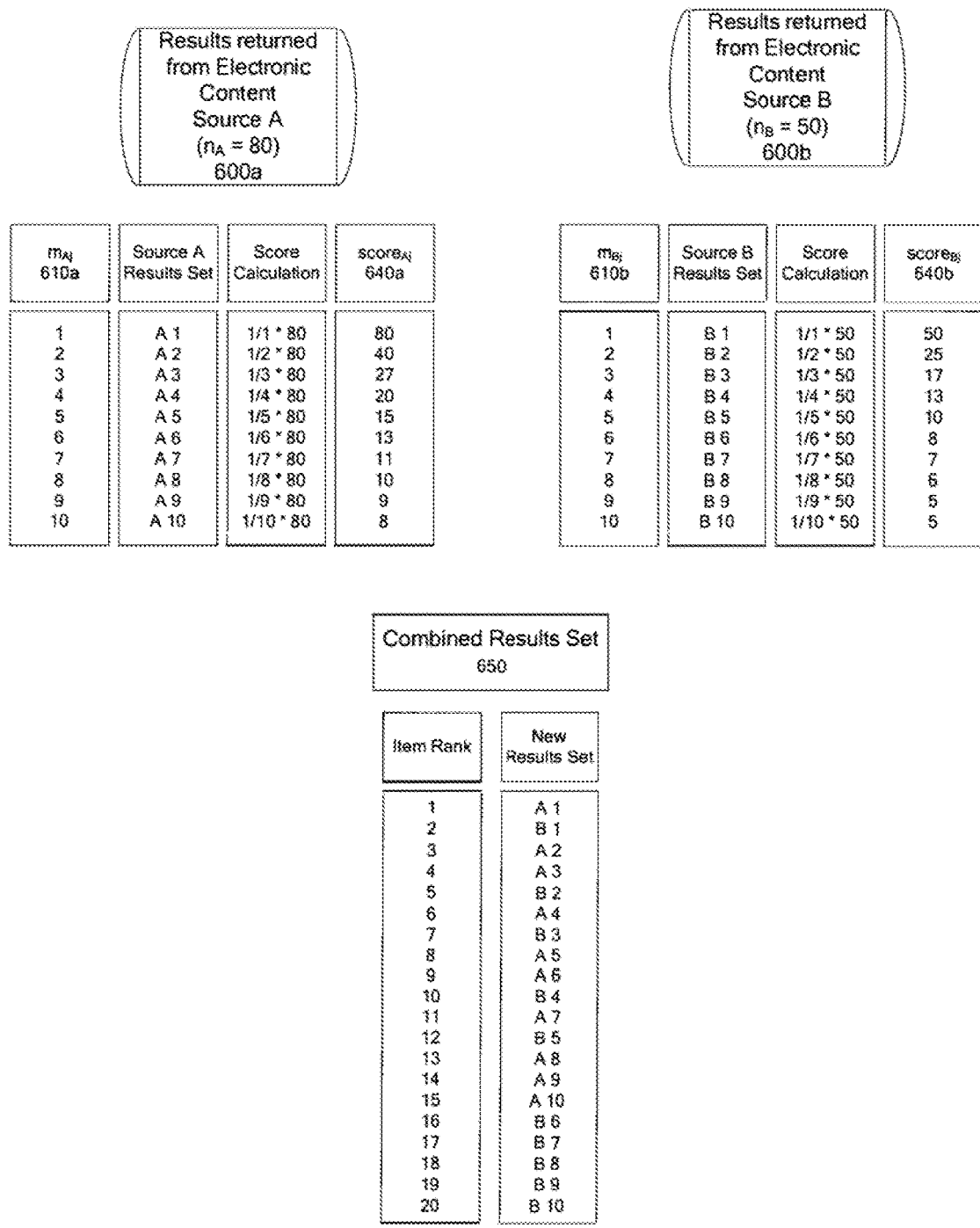
FIG. 6 is an exemplary illustration of re-ranking results, according to an embodiment of the present disclosure.

FIG. 6 is an exemplary illustration of re-ranking results items from results sets returned by multiple electronic content sources, according to an embodiment of the present disclosure. In this example, Electronic Content Source A may have a source rating, $n_A$, of 80 and Electronic Content Source B may have a source rating, $n_B$, of 50, as shown by 600a and 600b, respectively. A local statistic for each item in the respective results sets may be calculated as a function of the item order, $m_{Aj}$ and $m_{Bj}$, as shown by 610a and 610b. A global statistic, the reranking $score_{ij}$, may be calculated as a function of the result item rank, $m_{u}$, and the source rating, $n_i$, such that $score_{ij}$ for each results item is the product of the inverse rank for each result item multiplied by the source rating, as shown by 640a and 640b. The combined results set contains items from Electronic Content Source A and items from Electronic Content Source B and is arranged by sorting the respective results items by their associated global $score_{ij}$, as shown by 650.

As discussed above, each content source (e.g., electronic content network, database, etc.) may determine scores for the content in the respective collections pursuant to the query. The Connector Framework may receive the results from the individual electronic content networks, calculate local ranking scores per item, and store the results, which may include respective ranking and/or other scores, in source-specific caches. After all individual results are received, a time threshold passes or other precondition is met, the query broker system may merge the results according to a merging algorithm. The merging algorithm may consider local ranking scores, source specific general scores and/or other factors and conditions.

According to an embodiment of the disclosure, the systems and processes described in this disclosure may be implemented on any general or special purpose computational device, either as a standalone application or applications, or even across several general or special purpose computational devices connected over a network and as a group operating in a client-server mode. According to another embodiment of the disclosure, a computer-usable and writeable medium having a plurality of computer readable program code stored therein may be provided for practicing the process of the present disclosure. The process and system of the present disclosure may be implemented within a variety of operating systems, such as a Windows® operating system, various versions of a Unix-based operating system (e.g., a Hewlett Packard or a Red Hat Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present disclosure may comprise computer readable program code in the form of functional instructions stored in the computer-usable medium such that when the computer-usable medium is installed on the system or systems, those components cause the system to perform the functions described. The computer readable program code for the present disclosure may also be bundled with other computer readable program software. Also, only some of the components may be provided in computer-readable code.

Additionally, various entities and combinations of entities may employ a computer to implement the components performing the above-described functions. According to an embodiment of the disclosure, the computer may be a standard computer comprising an input device, an output device, a processor device, and a data storage device. According to other embodiments of the disclosure, various components may be computers in different departments within the same corporation or entity. Other computer configurations may also be used. According to another embodiment of the disclosure, various components may be separate entities such as corporations or limited liability companies. Other embodiments, in compliance with applicable laws and regulations, may also be used.

According to one specific embodiment of the present disclosure, the system may comprise components of a software system. The system may operate on a network and may be connected to other systems sharing a common database and common servers operating additional data or application services. Other hardware arrangements may also be provided.

Other embodiments, uses, and advantages of the present disclosure will be apparent to those skilled in the art from consideration of the specification and practice of the disclosure disclosed herein. The specification and examples should be considered exemplary only. The intended scope of the disclosure is only limited by the claims appended hereto.

While the disclosure has been particularly shown and described within the framework of query processing, it will be appreciated that variations and modifications can be effected by a person of ordinary skill in the art without departing from the scope of the disclosure. Furthermore, one of ordinary skill in the art will recognize that such processes and systems do not need to be restricted to the specific embodiments described herein.

The invention claimed is:

1. A computer implemented method for determining relevant electronic content in response to a query, the method comprising:
receiving a query at a computer implemented search engine from a user device;
categorizing the query to identify via a taxonomy one or more electronic content sources, wherein the categorizing is dynamically performed, independent of user input, by a categorizing module communicatively coupled with the computer implemented search engine;
formatting the query to at least one language usable by the one or more electronic content sources, wherein the formatting is performed, independent of user input, by a formatting module communicatively coupled with the computer implemented search engine;

transmitting the formatted query to the one or more electronic content sources, wherein each of the one or more electronic content sources comprises a corresponding search module;

receiving results in response to the formatted query from the one or more electronic content sources, the results containing a response latency;

merging the results based at least in part on one or more factors, the one or more factors comprising one or more local ranking statistics that are computed at each of the one or more electronic content sources, the one or more local ranking statistics related to one or more terms associated with the formatted query; and formatting the results for delivering to the user device.

2. The method of claim 1, wherein the user device comprises one or more of an internet-enabled input device, an internet or voice-enabled mobile device, a voice-enabled input device, a computer, and a kiosk.

3. The method of claim 1, wherein the one or more factors further comprise one or more of global factors, local factors, editorial rating, response reliability, response latency, content relevance, content extensiveness or coverage, user preferences, usage statistics, query frequency, category frequency, distributor preferences, recommendation statistics, user-generated ratings, business relationships, user demographic characteristics, location, language, social networks, social groups, personalization characteristics, page size, graphic, text elements, source rating, reliability factor, latency factor, business rules, business relationships, demographic preferences, marketing goals, local ranking scores, source ordering values, source-specific general scores, source factors, result-based ranking, relevancy, accuracy, usage factors, statistics associated with results item textual or non-textual analysis, statistics associated with data or text mining analyses, statistics associated with data or textual clustering, statistics associated with non-textual pattern analysis, statistics associated with device specifics, and statistics associated with formatting specifications.

4. The method of claim 1, wherein the query is classified into a category in one or more taxonomies or controlled vocabularies.

5. The method of claim 1, further comprising:
dynamically computing the one or more local ranking statistics for each result related to the one or more terms associated with the formatted query at each of the one or more electronic content sources, wherein the one or more local ranking statistics are also dynamically computed for each result related to metadata in a query context.

6. The method of claim 1, further comprising:
computing at least one global and/or one local statistic related to one or more content items in the results;
determining one or more relevancy scores for the results from the one or more electronic content sources in accordance with the at least one global and/or one local statistic;
computing a normalization factor;
normalizing the one or more relevancy scores in accordance with the normalization factor; and
combining the results into a single results set based on an ordering determined by the normalization factor.

7. The method of claim 1, further comprising:
storing results from each electronic content source in one or more caches;
accessing the one or more caches to retrieve existing results; and formatting the retrieved existing results based on one or more query context parameters.

8. The method of claim 1, wherein categorizing the query occurs dynamically at a time the query is received.

9. The method of claim 1, further comprising:
identifying one or more duplicate results.

10. The method of claim 9, further comprising:
removing the one or more duplicate results according to one or more of user preference, device preference, and distributor preference.

11. The method of claim 9, further comprising:
retaining the one or more duplicate results according to one or more of user preference, device preference, and distributor preference.

12. The method of claim 1, wherein the results are merged based at least in part on one or more of textual relevance, user preference, order, relevance or similarity score, and result item factors.

13. The method of claim 12, wherein the result item factors comprise one or more of source ratings, metadata relevancy factor, similarity factor, ranking factor, distributor preferences, usage patterns, location, device specifications, query frequency, and category frequency.

14. At least one non-transitory computer readable storage medium comprising instructions that, when executed by one or more computer processors, cause the one or more computer processors to:
receive a query at a computer implemented search engine from a user device;
categorize the query to identify via a taxonomy one or more electronic content sources, wherein the categorizing is dynamically performed, independent of user input;
format the query to at least one language usable by the one or more electronic content sources, wherein the formatting is performed independent of user input;
transmit the formatted query to the one or more electronic content sources, wherein each of the one or more electronic content sources comprises a corresponding search module;
receive results in response to the formatted query from the one or more electronic content sources, the results containing a response latency;
merge the results based at least in part on one or more factors, the one or more factors comprising one or more local ranking statistics that are computed at each of the one or more electronic content sources, the one or more local ranking statistics related to one or more terms associated with the formatted query; and
format the results for delivering to the user device.

15. A computer implemented system for determining relevant electronic content in response to a query, the system comprising:
a receiving module, of a computer implemented search engine, for receiving a query from a user device;
a categorizing module, communicatively coupled with the computer implemented search engine, for categorizing the query to identify via a taxonomy one or more electronic content sources wherein the categorizing is dynamically performed independent of user input;
a formatting module, communicatively coupled with the computer implemented search engine, for formatting the query to at least one language usable by the one or more electronic content sources;
a transmitting module for transmitting the formatted query to the one or more electronic content sources, wherein each of the one or more electronic content sources comprises a corresponding search module;

a receiving module for receiving results in response to the formatted query from the one or more electronic content sources, the results containing a response latency;

a merging module for merging the results based at least in part on one or more factors, the one or more factors comprising one or more local ranking statistics that are computed at each of the one or more electronic content sources, the one or more local ranking statistics related to one or more terms associated with the formatted query; and a results module for formatting the results for delivering to the user device.

16. The system of claim 15, wherein the user device comprises one or more of an internet-enabled input device, an internet or voice-enabled mobile device, a voice-enabled input device, a computer, and a kiosk.

17. The system of claim 15, wherein the one or more factors further comprise one or more of global factors, local factors, editorial rating, response reliability, response latency, content relevance, content extensiveness or coverage, user preferences, usage statistics, query frequency, category frequency, distributor preferences, recommendation statistics, user-generated ratings, business relationships, user demographic characteristics, location, language, social networks, social groups, personalization characteristics, page size, graphic, text elements, source rating, reliability factor, latency factor, business rules, business relationships, demographic preferences, marketing goals, local ranking scores, source ordering values, source-specific general scores, source factors, result-based ranking, relevancy, accuracy, usage factors, statistics associated with results item textual or non-textual analysis, statistics associated with data or text mining analyses, statistics associated with data or textual clustering, statistics associated with non-textual pattern analysis, statistics associated with device specifics, and statistics associated with formatting specifications.

18. The system of claim 15, wherein the query is classified into a category in one or more taxonomies or controlled vocabularies.

19. The system of claim 15, further comprising:

a computing module for dynamically computing the one or more local ranking statistics for each result related to the one or more terms associated with the formatted query at each of the one or more electronic content sources, wherein the one or more local ranking statistics are also dynamically computed for each result related to metadata in a query context.

20. The system of claim 15, further comprising:

a first computing module for computing at least one global and/or one local statistic related to one or more content items in the results, wherein one or more relevancy scores are determined for the results from the one or more electronic content sources in accordance with the at least one global and/or one local statistic; and a second computing module for computing a normalization factor, wherein the one or more relevancy scores are normalized in accordance with the normalization factor; and the results are combined into a single results set based on an ordering determined by the normalization factor.

21. The system of claim 15, further comprising:

one or more caches for storing results from each electronic content source, wherein the one or more caches are accessed to retrieve existing results; and wherein the retrieved existing results are formatted based on one or more query context parameters.

22. The system of claim 15, wherein categorizing the query occurs dynamically at a time the query is received.

23. The system of claim 15, further comprising:

a module for identifying one or more duplicate results, and removing or retaining the one or more duplicate results according to one or more of user preference, device preference, and distributor preference.

24. The system of claim 15, wherein the results are merged based at least in part on one or more of textual relevance, user preference, order, relevance or similarity score, and result item factors.

25. The system of claim 24, wherein the result item factors comprise one or more of source ratings, metadata relevancy factor, similarity factor, ranking factor, distributor preferences, usage patterns, location, device specifications, query frequency, and category frequency.

* * * * *